(12) United States Patent
Papshev et al.

(10) Patent No.: US 10,426,244 B2
(45) Date of Patent: Oct. 1, 2019

(54) SYSTEM AND METHOD FOR A NAIL MANIPULATION

(71) Applicant: Finails Oy, Espoo (FI)

(72) Inventors: Andrei Papshev, Espoo (FI); Temmo Pitkänen, Espoo (FI)

(73) Assignee: Finails OY, Espoo (FI)

( * ) Notice: Subject to any disclaimer, the term of this patent is extended or adjusted under 35 U.S.C. 154(b) by 222 days.

(21) Appl. No.: 15/199,545

(22) Filed: Jun. 30, 2016

(65) Prior Publication Data

US 2016/0309877 A1 Oct. 27, 2016

Related U.S. Application Data

(63) Continuation-in-part of application No. PCT/FI2013/051215, filed on Dec. 31, 2013.

(51) Int. Cl.
*A45D 29/00* (2006.01)
*A45D 31/00* (2006.01)
(Continued)

(52) U.S. Cl.
CPC ............ *A45D 29/00* (2013.01); *A45D 31/00* (2013.01); *A45D 44/005* (2013.01); *B33Y 30/00* (2014.12);
(Continued)

(58) Field of Classification Search
CPC ...... A45D 29/00; A45D 29/001; A45D 29/14; B05B 16/20
(Continued)

(56) References Cited

U.S. PATENT DOCUMENTS 3,563,252 A * 2/1971 Spohr .................... A45D 29/14
132/73.6
4,117,854 A * 10/1978 Rosenbloom .......... A45D 29/05
132/75.8
(Continued)

FOREIGN PATENT DOCUMENTS

EP 0517515 A1 1/1994
EP 1433597 A1 6/2004
(Continued)

OTHER PUBLICATIONS

European Patent Office, Supplementary European Search Report of EP patent application No. 13900781.9.
(Continued)

*Primary Examiner* — Michael Roswell
(74) *Attorney, Agent, or Firm* — Berggren LLP

(57) ABSTRACT

A system for a nail manipulation, such as producing an object onto the nail, comprises a shape information providing means, object or design providing means, manipulation means and controlling means. The shape information providing means typically scans the shape and/or position of the nail for providing first controlling data. The object providing means typically provides object data related to the object to be produced for providing second controlling data. The manipulation means is e.g. a 3D printer or dispensing means, which produces the object onto the nail. The controlling means is used for controlling the operation of the manipulation means based on the first and second controlling data in order to produce said desired object onto the nail to be manipulated.

24 Claims, 4 Drawing Sheets

(51) Int. Cl.
*B33Y 30/00* (2015.01)
*B33Y 50/02* (2015.01)
*B33Y 70/00* (2015.01)
*A45D 44/00* (2006.01)
*G05B 19/4097* (2006.01)

(52) U.S. Cl.
CPC ............... *B33Y 50/02* (2014.12); *B33Y 70/00* (2014.12); *G05B 19/4097* (2013.01); *A45D 2029/005* (2013.01); *A45D 2044/007* (2013.01)

(58) Field of Classification Search
USPC .......................................... 700/233; 132/200
See application file for complete search history.

(56) References Cited

U.S. PATENT DOCUMENTS

| | | | | |
|---|---|---|---|---|
| 5,036,576 A | * | 8/1991 | Gast | B21J 15/105 227/1 |
| 5,139,546 A | * | 8/1992 | Novobilski | A45D 29/00 55/318 |
| 5,865,487 A | * | 2/1999 | Gore | B25J 15/06 294/2 |
| 6,030,623 A | * | 2/2000 | Meade | A61K 36/88 424/776 |
| 6,035,860 A | * | 3/2000 | Mombourquette | A45D 29/00 132/200 |
| 6,067,996 A | | 5/2000 | Weber | |
| 6,286,517 B1 | | 9/2001 | Weber | |
| 6,328,949 B1 | | 12/2001 | Tessarolo | |
| 8,820,866 B2 | * | 9/2014 | Kasahara | B41J 3/407 347/106 |
| 9,289,046 B1 | * | 3/2016 | Blackwell | A45D 29/001 |
| 9,578,948 B2 | * | 2/2017 | Raouf | A45D 29/001 |
| 2001/0047309 A1 | * | 11/2001 | Bartholomew | A45D 29/00 700/233 |
| 2003/0217758 A1 | * | 11/2003 | Mesirow | A45D 29/001 132/73.5 |
| 2007/0292626 A1 | * | 12/2007 | Larsson | B05B 16/20 427/424 |
| 2010/0252058 A1 | * | 10/2010 | Rehkemper | A45D 29/00 132/73 |
| 2011/0277338 A1 | | 11/2011 | Li | |
| 2012/0204341 A1 | * | 8/2012 | Nguyen | A47C 1/04 4/621 |
| 2013/0038648 A1 | | 2/2013 | Kasahara | |

FOREIGN PATENT DOCUMENTS

| | | |
|---|---|---|
| JP | 3064019 U | 9/1999 |
| JP | 2000006384 A | 1/2000 |
| JP | 2004-216872 A | 8/2004 |
| JP | 2005-278752 A | 10/2005 |
| JP | 2007-136099 A | 6/2007 |
| JP | 2008073503 A | 4/2008 |
| JP | 2012-232041 A | 11/2012 |
| JP | 2013-220146 A | 10/2013 |
| RU | 2493759 C2 | 9/2013 |
| WO | 2004/043200 A1 | 5/2004 |

OTHER PUBLICATIONS

Finnish Patent and Registration Office, International search report of PCT/FI2013/051215 dated Sep. 19, 2014.
RU Office Action dated Jan. 17, 2018, application No. 2016127458
JP Office Action dated Jan. 30, 2018, application No. 2016-544548 with EN translation.

* cited by examiner

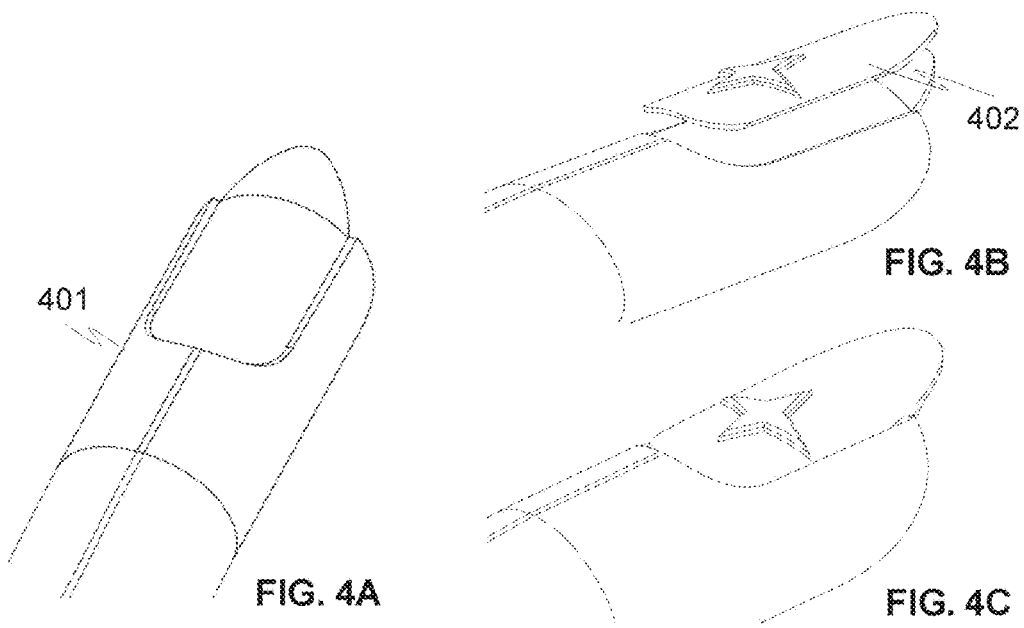
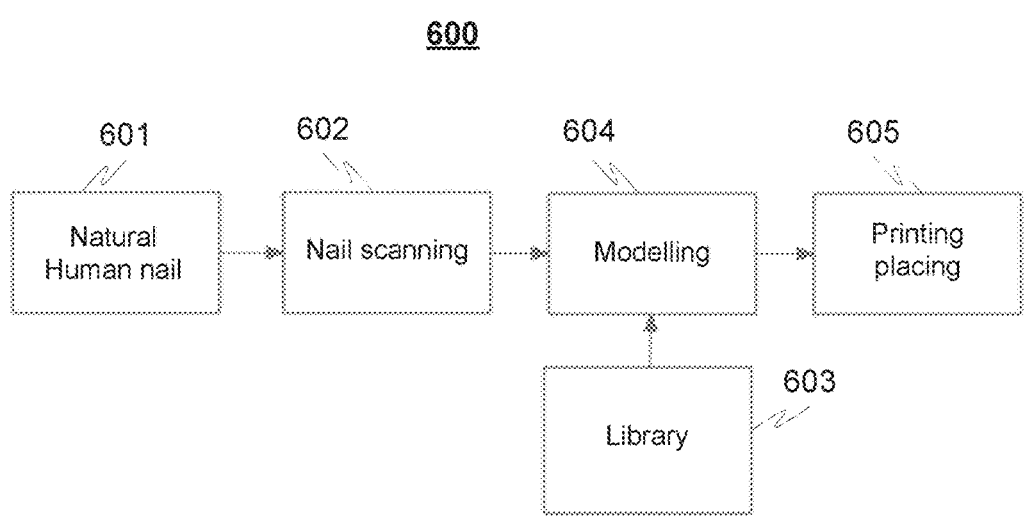

SYSTEM AND METHOD FOR A NAIL MANIPULATION

PRIORITY

This is a continuation in part application of PCT/FI2013/051215 which was filed on Dec. 31, 2013, and the contents of which are incorporated herein by reference.

TECHNICAL FIELD OF THE INVENTION

The invention relates to a method and system for a nail manipulation, such as decorating nails.

BACKGROUND OF THE INVENTION

There are known treatments in the beauty industry for more than fifty centuries, which are related to the nails treatment: so called "manicure" for fingernails and hands, as well as "pedicure" for toenails treatment. The nail manipulation, such as manicure, pedicure, and nail decorations as well as artificial nails is very common nowadays, and they are performed for example both in beauty salons and home mainly by handwork. Few tools or devices are known from prior art for nail manipulation, such as manually operated grinding tools and spraying devices.

There are however some disadvantages relating to the known prior art, such as that the nail manipulation is time consuming and making of decorations to quite small areas of the nail are very accurate procedure. In addition some manipulations, e.g. treatments of artificial nails, such as for example gel nails or acrylic nails, are quite complex and requires knowledge and using of special chemical agents, like lacquer and treatment liquids, such as acrylic, acetone, which are typically harmful to health. In addition the processes cause also odours. Quite often there is also a need to use an external specialist for the treatments, due to the complexity of certain procedures, e.g. such as gel or acrylic nails. Furthermore there is often a need for the number of specialized equipment, such as UV curing lamp (ultraviolet) and mechanical removal equipment, which increases the cost of the treatment procedures. Additionally there is a need to frequently perform maintenance for the gel nails or acrylic nails, often periodically after some weeks.

SUMMARY OF THE INVENTION

An object of the invention is to alleviate and eliminate the problems relating to the known prior art. Especially the object of the invention is to provide a system for performing nail manipulation easily, accurately and fast and in safe manner so that possible odours and radiation dosages due to UV radiators, as well as dosages due to chemical treatments and agents can be minimized. In addition the object of the invention is to offer a nail manipulation system, where everyone can easily make different kinds decorations or artificial nails or other members onto the nails.

The object of the invention can be achieved by the features of independent claims.

The invention relates to a system for a nail manipulation. In addition the invention relates to a method for a nail manipulation.

According to an embodiment of the invention the system for nail manipulation, such as producing an object onto the nail or performing other treatments (decorative, curing or medical treatment, or natural nail reconstruction with biomaterial) to the nail, comprises object providing means for providing object data related to the object to be produced onto the nail and a manipulation means for producing said object onto the nail to be manipulated. The object data may be e.g. vector graphics or bitmap data, colours and dimension or other data, which can be used for manufacturing said object. The system advantageously comprises also shape information providing means for providing nail information of a shape and/or position of the nail or area of the nail to be manipulated, whereupon the system is configured to provide first controlling data based on said nail information for controlling the operation of the manipulation means. In addition the system is also configured to provide second controlling data based on said object data of the object providing means, for additionally controlling the operation of the manipulation means.

The manipulation may comprises for example printing, painting, cleaning, removing of artificial nails, application of primary layer or transparent, translucent or single-colour of multi-colours paints and lacquers, including UV lacquers, oiling, mechanical cleaning, grinding, brushing, greasing and finger massaging, as an example. The system advantageously comprises corresponding manipulation means, such as printer, nail brush and/or spray coater, dispenser, cleaner, remover, UV radiator as well as mechanical devices, like grinding, brushing, greasing and finger massaging devices, as an example. In addition it is to be noted that also medical or chemical agents can be applied by the system of the invention for example medically treating or cure the nail, such as curing any fungi, or encapsulating a certain portion of the nail by a chemical or medical curing medium, or natural nail reconstruction with 3D biomaterial, for example. According to an example the manipulation means may comprise also cutting means, such as a laser or mechanical cutting means for cutting the nail or artificial nail or object material to be provided onto the nail.

According to an embodiment the shape information providing means is an imaging means, such as a camera or scanner, e.g. laser scanner, which determined the position and shape of the nail surface to be manipulated. For manipulation, such as providing detailed decoration or artificial nails, it is very important to know both the shape and especially the position of the nail in order to achieve accurate results without overflows (especially to the skin tissue areas). The shape information providing means may also be implemented by numbers of cameras in order to achieve/reconstruct 3D profile or shape information. Also mechanical tip type members can be used for detecting e.g. depth or curvature of the nail (at least on z-direction or 3D reconstruction). For a certain embodiment only few measuring points are needed to get sufficient curvature information. As an example the shape information providing means may also comprise capacitive, RF, ultrasound or microwave scanning means or combination of the above configured to scan at least the 2D or 3D shape and/or position or area of the nail to be manipulated.

According to an example also masks, such as tape or label type means can be used around the nail so to expose only the desired area for nail manipulation, such as for the dispenser. In this example the shape information providing means may detect the edge of the mask and thereby the uncovered area of the nail and thereby provide position or area information of the nail to be manipulated. The mask may comprise conductive or optically detectable (colour or the like) material in order to facilitate the determination of the area. According to an additional example an image of the nail may be displayed via display means in real time to the user, whereupon the user can select the desired area of the nail to be manipulated. The selection can be advantageously done by any suitable user interface means, such as using a joystick or mouse or electrical pen or by gesture based commands (finger command in a touch screen, whereupon the shape information providing means may provide position or area information of the nail to be manipulated. It is to be noted that according to an exemplary embodiment the accurate shape information is not needed (if there is no need for an accurate manipulation), whereupon the manipulation can be done without accurate shape information of the shape of the nail to be manipulated or alternatively a standard model or other guess can be used as a surrogate of the real shape of the current nail (however, this is only an example).

According to an embodiment the shape information providing means comprises or is in data connection with a database, which comprises shape information of the nails. The shape information may be individual shape information related to a certain user, or the database may also comprise an exemplary nail library, where the user can select a similar nail, the shape of which corresponds with the shape of the nail to be manipulated. According to an embodiment the system may comprises a separate scanner for individual nail identification purpose (for example a finger prints scanner) in order to authenticate the user (or finger) and thereby selected the shape of the nail of the individual finger in question from the database, if the nail information has been stored and/or imported to the database earlier. In addition the authentication may also be used for other purposes in the system, such as allowing or opening an access to a certain database, cloud server pages, related social media pages or user interface.

According to an embodiment the object providing means comprises a database having a number of objects to be selected, and object data related to said object, such as artwork, graphical, 2D/3D object, design, or manufacturing information of the object (e.g. vector graphics or bitmap information). The database may be offered via a shop like application in the data network or the database may also be at least partially internal part of the system. Object data may also comprise e.g. information about colours, dyes, chemical agents, viscosities to be used, or building material for artificial portions for producing the object, or coordinate or modelling information about the object, which can be used for controlling the operation of the manipulation means or for modelling or providing controlling data for said controlling.

According to an embodiment the object providing means comprises a receiving means for receiving a concrete object, such as a physical artificial nail to be attached to the nail. In this case the manufacturing information may be related to orientation of the object for attaching as well as possibly also information about the use of chemical agent(s), such as glue or lacquer in order to attach said artificial nail onto the real nail of the user. The receiving means may be configured for receiving also building materials suitable for the object, as well as manufacturing information to compose the desired object about the building materials received.

According to an embodiment the building materials may be received in a kit, where the kit may comprise said object data or manufacturing information for the system in a readable form, whereupon the object providing means advantageously comprises reading means, such as RFID, 2D tag, and/or other machine/human readable means, for reading said manufacturing information from the kit. The manufacturing information of the kit may also comprise a link to a certain address, such as web address or the like, where the user or system may gather the manufacturing information, such as how to fix or handle said building materials of the kit in order to provide said object. Advantageously the system is configured to form controlling signals for the controlling means at least partially based on said manufacturing information.

According to an embodiment the object providing means comprises a user interface means or application, via which the object can be designed. The designs or objects can be created e.g. by feeding an image (in an electronic format) from which the application produces corresponding object data and again the object data so that the controlling means can control the operation of the manipulation means correspondingly to produce said object onto the nail. It is to be noted that the image can be created by any known methods and devices, such as by a camera or scanner and that the image may represent any imaged object. For example the image may be taken from clothes worn by the user, whereupon the overall style of the user, including also the style of the nails, is consistent and uniform.

According to an embodiment the application may be configured to share said designs or objects (data) created by the user to a data communication server, such as to a certain forum, or social media, in the internet or cloud based service. The application is according to an embodiment a digitally implemented shop in the data communication network, via which the object or designs or the like data for the nail manipulation can be selected, bought, shared, downloaded or produced.

In addition according to an embodiment the system may be configured to provide said object data by imaging or scanning an earlier object e.g. directly from the nail of the user. For example the system may focus a camera or the like of the system and take an image of the user's nail, whereupon said image is used as the object data. The system may be configured to model said object data into any suitable form for controlling said system to manufacture a new object corresponding said imaged one. The suitable form may be e.g. instruction data, such as said second controlling data or at least portion or basement of said second controlling data. Thus the system is can be configured to function as a copy type machine for multiplying said objects. It is to be noted that according to an example at least two or more systems may be functionally connected so (e.g. via a wireless or wired data communication link or via an application on the network) that the object of the first nail is scanned by the scanner of the first system for providing object data of said first nail's object, whereupon the said object data is communicated to at least one second system, which is then configured to produce said object to at least one second nail.

The system advantageously comprises controlling means for controlling the operation of the manipulation means based on said first and second controlling data in order to produce said desired object onto the nail to be manipulated. The first data may comprise e.g. shape and position information of the nail, whereupon the controlling means may control for example the movements of the manipulation means, such as 2D/3D printer, dispenser, scanning or imaging means, or the like, to follow the shape of the nail being positioned to a determined position. The second data may comprise e.g. object data for manufacturing the object, such as data about the colours, dyes, chemical agents, building material for artificial portions, as described above. The system is advantageously configured to provide controlling data for said controlling means to control the operation of the manipulation means, such as operational parameter, e.g. coordinated movements, size or amount of the dose of different material, timing for certain operations, like UV radiators, pressure and/or size of a nozzle of an airbrush and selection of material and tools to be used for object production, as an example.

According to an example the system also comprises an ergonomically designed holder for the fingers and/or armrest. In addition in case of building a gel extension, the system may also comprise an extension support for the portion or object to be manipulated, such as built.

According to the invention the object to be provided may be for example an image, design, 2D or 3D object, implantation, insulating, conducting or semiconducting layer (for example for enhancing conductivity for physiological signal measurement from the finger), RFIF tag, mechanical structure, electronic component, such as a watch or LED or a display, such as an electrophoretic ink paper display structures, as an example. The laser cutting means of the system may be used for example cutting display or other structures to be provided onto the nail.

The nail manipulation according to the embodiments of the invention may comprise e.g. following:
  cleaning of the nails and fingers,
  indirect manufacturing of the gel nails, acrylic nails or similar artificial nails by means of 3D printer,
  direct manufacturing of the artificial nail on the human nail surface by means of low temperature 3D printing method,
  application of the indirectly manufactured artificial nails onto the human nail surface and/or finger using for example adhesives,
  maintenance operations for artificial nails,
  application of the primary layer,
  application of transparent, translucent or single-colour or multi-colour paints and lacquers, and/or
  application of specific biomaterial for natural nail reconstructions.

The system may be implemented as a manual, semi-automated or fully automated manicure and pedicure manipulation system. In addition the system may be configured to offer as a manipulation: a) treatment for one finger at one time, b) treatment for two or more fingers at one time, c) treatment for the whole hand/leg fingers at one time or d) treatment for more than one hand/leg fingers at one time.

According to the invention nail designs (object data) are advantageously made, stored and transferred in digital (computer) format, which makes it easier to design, store, perform, editing and/or manipulation (such as scaling, addition of a new design 2D and/or 3D elements), repeat the design (e.g. in other positions and/or use it for the reworking of damaged nail design), and/or share with other people or store for future use.

The present invention offers advantages over the known prior art, such as simplifies the treatment procedures, bringing a certain level of automation and consequently reduce the treatment time, cost an the need of the specialist. The invention also offers completely new possibilities of implementing e.g. 3D shapes for the artificial nails, which can be created based on the real-time scanning method for the nail surface of a particular person (nail 3D pattern recognition can be utilized). By implementing the accurate scanning techniques for the nails, the invention is also targeting to extend the maintenance period for the artificial nails. In addition the invention also reduces health risks related to UV or microwave radiation on the skin and as result potential risk of cancer, namely due to accurate scanning or imaging methods (shape information providing means) the radiator can be introduced very close to the nail area to be operated resulting thus the very limited exposed skin area and thereby also reduced radiation dose. Furthermore the system of the invention reduces or completely eliminates the disturbing odours, which is part of the present treatments, by using a specific type of ventilation and filtering, as discussed in this document.

BRIEF DESCRIPTION OF THE DRAWINGS

Next the invention will be described in greater detail with reference to exemplary embodiments in accordance with the accompanying drawings, in which:

FIGS. 4A-4C illustrate an exemplary method for artificial nail installation according to an advantageous embodiment of the invention, FIG. 6 illustrates a principle of an exemplary process chart for nail manipulation according to an advantageous embodiment of the invention.

DETAILED DESCRIPTION

Figure 1:
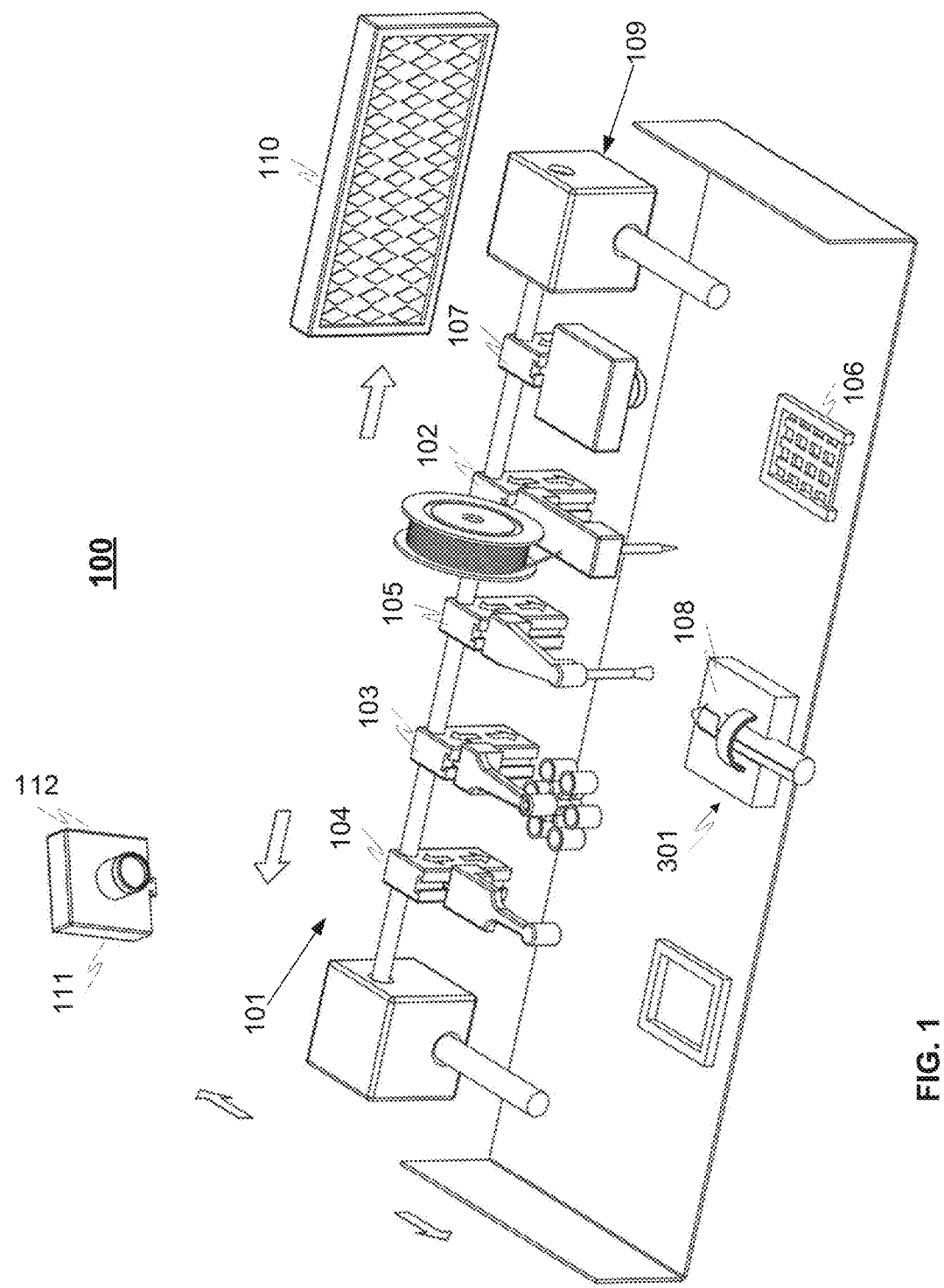
FIG. 1 illustrates a principle of an exemplary system for nail manipulation according to an advantageous embodiment of the invention.
Figure 5:
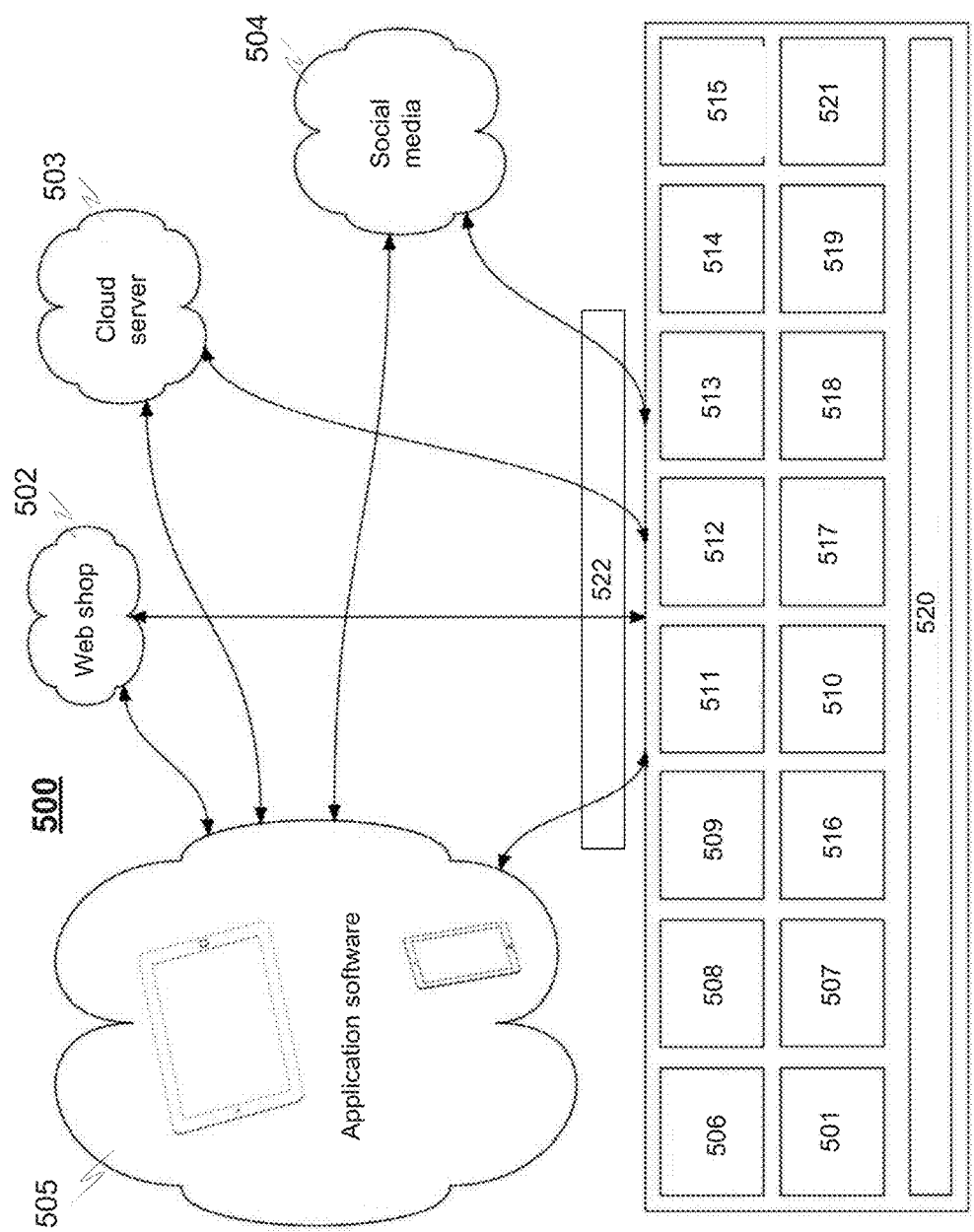
FIG. 5 illustrates an exemplary block diagram of the system for nail manipulation according to an advantageous embodiment of the invention.

FIG. 1 illustrates a principle of an exemplary system 100 and FIG. 5 an exemplary block diagram 500 of the system 100 for nail manipulation according to an advantageous embodiment of the invention. The system comprises the object providing means, which can be implemented e.g. by a internal database 501 of the system or the database may be located in the internet and used via a web shop application 502 or other application server, such as cloud server 503 or social media servers 504 as well as mobile application software implemented by mobile devices 505, where users can select, buy, share, download, upload or design and produce the objects. These kinds of applications 501-505 of the object providing means may comprise design libraries, designs or personal pages and possibilities for design sharing, as an example. The object providing means is advantageously configured to provide object data related to the object to be produced onto the nail. The design can be created for example by feeding an image or photo to the application, where it can be additionally designed to the object. In addition according to an embodiment the object providing means may also comprise a receiving means for receiving a concrete completed object, such as a physical artificial nail to be attached to the nail, and possible attaching instructions as said manufacturing information.

The system also comprises the manipulation means 101 for producing the object onto the nail to be manipulated. The manipulation means comprises for example printer, like a 3D printer 102, and unit 103 for dispenser and/or airbrush or tampo printer, which are advantageously configured to build up the layers of the object and colouring, for example. In addition the manipulation means comprises curing unit 104, which may comprises for example UV radiation means, like a UV LED, or warm air blowing means or microwave radiation means.

The dispenser or airbrush means are advantageously configured to provide nail manipulating medium, such as primer, colour, glued, gel medium (for shaping), transparent, translucent or single- of multi-colour paints and lacquers, including UV lacquers medium. The dispensing may be done either by compressed air or screw type of dispenser or other known suitable dispensing techniques. The tampo printing may be used for final nail paint, where a ready 2D image can be transferred onto the nail surface, using an indirect offset printing process that involves an image being transferred from the cliché via a silicone pad onto nail surface. Optionally the painting might be done by using airbrush member of the manipulation means.

It is to be noted that the object may be produced either directly to the human nail, or alternatively the object may be produced onto the artificial nail blank or a separate base or a support member. If the object is produces onto the artificial nail or onto the nail blank or base or support (not directly onto the human nail), it is advantageously transferred onto the human nail by a pick and place head 105, which is advantageously a vacuum pick and place head. It is to be noted that the system may comprise also artificial nail and additional particle holder 106, where the artificial nail can be produced or where the ready artificial nails are kept and from where they are picked by the pick and place head 105. Also only the additional particles may be transferred onto the human nail from the holder 106 by the head 105 (assembling different trimming parts, like diamond etc. but as well artificial nails or nail extension).

The system comprises also the shape information providing means 107 for providing nail information of a shape and/or position of the nail to be manipulated. The shape information providing means may be a camera or scanner, e.g. laser scanner, or mechanical scanner, which determines the position and shape of the nail to be manipulated. It is to be understood that the shape information providing means 107 may also comprise a capacitive, RF, ultrasound or microwave scanning means or combination of the above configured to scan at least the 2D or 3D shape and/or position of the nail to be manipulated. In addition the shape information providing means may comprise or be in a data connection with a database, which comprises shape information of the nails. The system may also comprise a reader 108 for reading fingerprints, which is advantageously arranged in the connection with a finger supporting or holding means 301.

The system comprises also data processing means 522, which is configured to communicate at least with the object providing means, manipulation means and shape information providing means, and thereby configured to provide first controlling data based on the nail information as well as second controlling data based on the object data of the object providing means for controlling the operation of the manipulation means.

The system comprises also controlling means 109, which is configured to control the operation of the manipulation means in co-operation with the data processing means. The data processing means advantageously provides controlling data (commands), how the controlling means must operate. The controlling means may control for example the movements and operational parameters (like dispensing and timing parameters) of the manipulation means, such as 2D/3D printer, dispenser, scanning or imaging means, UV radiators, airbrush and selection of material to be used for object production, as an example. In addition the controlling means is configured to control also operation of the vacuum pick and place head 105, as well as mechanical manipulation means, not limiting to these only.

For example the controlling means may control the scanning of the nail by moving the laser scanner in an appropriate way and after object selection control the movements of the dispenser, as well as quantity of the medium, like colours, as well as used pressure of airbrush and movements and timing of UV radiating means. Thus the movements of the UV radiating means can be controlled to be happened only around the necessary area, and thereby UV radiation pollution can be minimized. Advantageously the controlling means is configured to perform X, Y and Z directional and/or rotational movements for the members it controls.

According to an embodiment the system is configured to model the shape, such as 2D or 3D shape, of the nail, and/or to model the object data so that the shape of the object according to the modelled object data corresponds with the shape data of the nail to be manipulated and thereby provide said controlling data (taking into account said first and second data described elsewhere in this document). It is to be noted that the system may perform the modelling with the help of the data processing means 522 (internally) or using external data processing capacities (externally), whereupon the external data processing means may only return calculated instructions or even ready controlling data for the controlling means.

The system may also comprise an odour removing means 110 for removing odour produced during the manipulation. The odour removing means 110 may be implemented e.g. by a fan with filter or an ionisation means.

The system may also comprise a camera 111 for on-time follow up of the treatment or manipulation. In addition the system may also comprise also display for providing visually operated user interface as well as for displaying real-time information about the manipulation, such as images of video. In addition the user can locate the finger in the right position much easier when seeing images or video of the process (especially when the system is enclosed in a non-transparent way).

In addition according to an embodiment the system may also comprise a cleaning module 112 for clean the syringe or other portions of the dispenser for example before every dispensing step or cleaning of other manipulating means, such as tampo printer or portions of it. The cleaning module 112 advantageously comprises cleaning agent, whereupon the system may move the dispenser or the like in the vicinity of the cleaning module and perform the cleaning step, such e.g. wipe or immerse the dispenser in the cleaning agent.

Figure 2A:
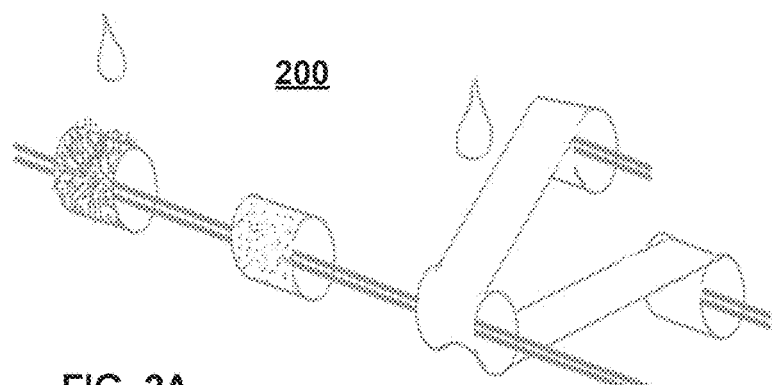
FIGS. 2A-2B illustrate exemplary accessories or options according to an advantageous embodiment of the invention.

FIG. 2A illustrates an example of the mechanical manipulation devices 200 of the system 100, like grinding, brushing, greasing and finger massaging devices.

Figure 2B:
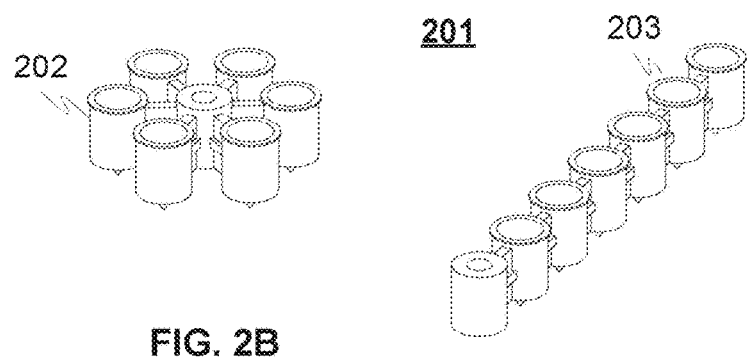

FIG. 2B illustrates an example of the dispenser, which may comprise a number of dispenser syringes. The dispenser 201 may use multiple dispenser syringes for different primer, glues, gels and lacquers and in different colours. The syringes can be separately loaded or ready in unit, and can be implemented as a cartridge 202 or cassette 203.

Figure 3A:
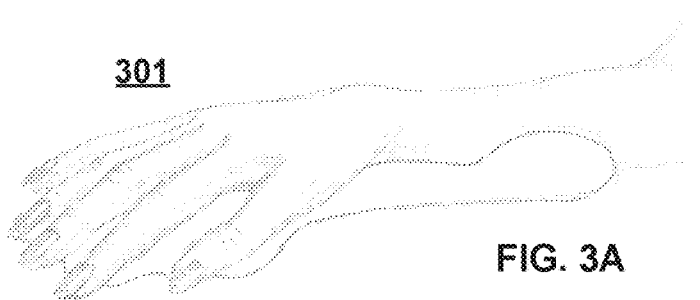
FIGS. 3A-3B illustrate exemplary hand or nail extension supporting members heads according to an advantageous embodiment of the invention.

FIG. 3A illustrates an exemplary hand supporting member 300, which is advantageously ergonomically designed holder for the fingers and/or armrest. The hand supporting member 300 may be configured to move or position the finger or the nail in questions according to the controlling instruction of the controlling means in right position so that the object producing is possible.

Figure 3B:
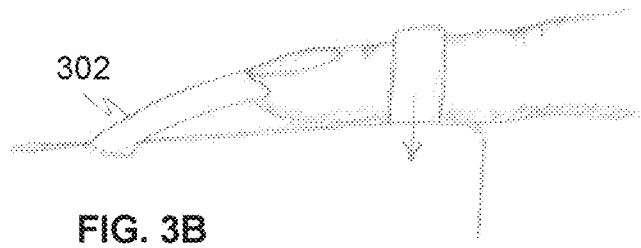

FIG. 3B illustrates an exemplary nail extension supporting members 302, which is advantageous in a case of building a gel extension to the nail. The supporting member may also be configured to support an artificial nail to be manufactured by a 3D printing and UV curing techniques, for example.

FIGS. 4A-4C illustrate an exemplary method for artificial nail installation according to an advantageous embodiment of the invention, wherein in FIG. 4A the finger is positioned into the right position and place in the system. A possible covering member 401 may be used for protecting the finger and exposing only the nail. Gels and additives can be applied for example in the phase of FIG. 4A before transferring the object, such as artificial nail 402 onto the nail, as is illustrated in FIG. 4B. After this the process can be finalised in FIG. 4C, which might include e.g. curing by the UV radiation and/or warm air.

FIG. 5 illustrates an exemplary block diagram 500 of the system 100 for nail manipulation according to an advantageous embodiment of the invention. The system may comprise e.g. the following functionalities, means, devices and blocks, such as wireless or wired communication means 506 for communicating different kinds of data with external entities, such as computers or mobile devices 505 running an application for operating and controlling the system (at least partially, such as providing object data), or external servers and applications or databases in the data network, such as a cloud server 503, web shop applications 502 and social media applications 504. In addition the system may comprise internal memory means 501 (managing e.g. internal database of the nail and design library) or reader means 507 for reading external memory cards.

The system may also comprise nail shape scanner 508 (as a part of the shape information providing means), nail design modelling unit (optional) 509, which might be an application by which the user may design and plan objects for the system, as well as a design translation software module 511 (design to CAM, for example), which translates the object data for the controlling means and/or for the data processing means 522 (which advantageously co-operates e.g. with a computer numerical control unit 510). In addition the system advantageously comprises a dispenser 512 for gel and adhesives, and a dispenser 517 for paints and lacquers, for example, and pick and place unit 513, a nail and finger supporting unit 514, 3D printer 515, mechanical manipulation means, such as a nail cleaning and roughing member 516, a curing unit 518 (including e.g. UV radiation and warm air blowing means), nail maintenance unit 519, odour cleaning and filtering unit 520 and power supply 521. In addition the system may also comprise a display for displaying real-time image or video image of the manipulation process or the system may be configured to transfer said image or video data to an external display device, such as to a computer or mobile devices 505.

The data processing means 522 is configured to control the operation of the above mentioned members, such as data communication and calculation and, advantageously together the controlling means 109, to control the operation of the manipulation means, such as the scanners 508, printers 515, dispensers 512, 517, and curing unit 518 as well as mechanical manipulation means 516.

FIG. 6 illustrates a principle of an exemplary process chart 600 for nail manipulation 601 according to an advantageous embodiment of the invention, where in step 602 the user nail is 2D or 3D scanned by scanner or camera or other suitable shape information providing means described in this document. As a result a first personal information file is provided, which represent at least the shape information of the nail. It is to be noted that this information as such or in modelled form may be stored e.g. to a database of the system comprising thus personal information about the shape of the nail. The first personal information may also be used for forming said first controlling data. In step 603 object data is provided e.g. by the object providing means. It is to be noted that the object data may be e.g. an image or design in a library (database to which said system is in data communication connection). Object data may be e.g. public data. The object data may be as such or may be formed as said second controlling data (such as JPG and vector graphic data).

In step 604 the system is configured to provide a modelling for matching said object data, e.g. image from step 603, to the shape of the nail provided in step 602. This modelling data (electronic file) is also personal information, where a certain image data and personal shape data of the nail is combined. The modelling data is according to an example analogously with CAM manufacturing file (CAM; computer numerical control file) controlling a CNC machine (CNC; computer-aided manufacturing machine). Also the modelling data can be stored e.g. to a database of the system as a personal modelled file for manufacturing a certain object. The modelling data comprises advantageously said first and second data. Thus according to an example the system may use said modelling data for controlling said manipulation means when manipulating, such as printing the object in step 605.

In addition it is to be noted that the system with the functionalities described in this document above may be implemented by a single device, or the functionalities may be implemented by separate modules. The separate modules are advantageously configured to function in a co-operational manner so that the data processing means and/or controlling means or the like communicates or operates with the separate modules in order to perform the steps of the overall system describer in this document. Thus the system term is used for representing both embodiments, a single device or arrangement comprising separate modules. For example the shape information providing means, such as a scanning member, object providing means, such as database or application, and/or manipulation means, such as the dispensers or printers, may all be implemented as separated modules. In addition the data computation and databases may be either internal portion of the system or device, or they can be managed by external computer, such as PC or mobile device like computers, or external servers, like cloud services via a data communication connection.

Furthermore it is to be noted that data managing and modelling as well as controlling operations may be managed by a suitable computer program product when run on a data processing means. The computer program product may be run at least partially in the system of the invention, external data processing devices or it might be divided between internal and external data processing devices.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. A nail manipulation system for producing an object onto a nail,
wherein the system comprises:
a shape information providing device for providing nail information of at least a shape of the nail to be manipulated, whereupon the system is configured to provide first controlling data based on said nail information, wherein the shape information providing device is a 3D-surface capturing device, an object providing device for providing object data, comprising object data related to the object to be produced onto the nail, whereupon the system is configured to provide second controlling data based on said object data, a manipulation device, wherein said manipulation device is configured to produce said object onto the nail to be manipulated, and a controlling device for controlling operation of the manipulation device based on said first and second controlling data to produce said object onto the nail to be manipulated, wherein the manipulation device comprises a dispenser configured to provide a nail manipulating medium following three dimensional shape of the nail to be manipulated according to a controlling instruction from the controlling device based at least on said first and second controlling data, wherein the nail manipulating medium is a gel, paint, lacquer or an adhesive.

2. The system of claim 1, wherein the system is configured to construct a nail extension onto the nail.

3. The system of claim 1, wherein the 3D surface capturing device is 3D scanner, a laser scanner, a camera, an RF scanning device or a capacitive scanning device.

4. The system of claim 1, wherein the object providing device comprises a database having a number of objects to be selected from, and object data related to said object being selected from the number of objects comprises information on one or more of: an artwork, a graphic, 2D/3D information, a shape, design information and manufacturing information of said object; whereupon the system is configured to form said second controlling data based on said information of said object.

5. The system of claim 1, wherein the object providing device comprises an application, which provides the object based on the object data inputted, or where the application comprises a user interface for creating said object by a user.

6. The system of claim 1, wherein the dispenser comprises a number of dispenser syringes and is a compressed air dispenser or a screw type dispenser.

7. The system of claim 1, wherein the manipulation device comprises a 3D printer configured to produce 3D object onto the nail to be manipulated according to controlling instructions of the controlling device based at least on said first and second controlling data.

8. The system of claim 1, wherein the manipulation device comprises a tampo printing device configured to produce 2D image and transfer it onto into the nail to be manipulated according to controlling instructions of the controlling device based at least on said first and second controlling data.

9. The system of claim 1, wherein the manipulation device is configured to provide for the nail a coating comprising a chemical or medical biological agent for medically curing the nail.

10. The system of claim 1, wherein the manipulation device comprises one or more capabilities for mechanical cleaning, grinding, brushing, greasing, oiling or finger massaging, removing artificial nails, paints, lacquers and other artificial layers or objects applied onto the nails surface and operated according to controlling instructions of the controlling device based at least on said first and second controlling data.

11. The system of claim 1, wherein the system comprises a holder for resting a finger or an arm, wherein the holder is configured to move the finger or the arm such that the nail to be manipulated is moved according to controlling instructions of the controlling device based at least on said first and second controlling data.

12. The system of claim 1, wherein the system comprises an odor removing device, for removing odor produced during the manipulation, comprising a fan with a filter or an ionization capability.

13. The system of claim 1, wherein the system comprises an ultraviolet (UV) source, a microwave source or a hot air blow source configured to provide an ultraviolet (UV) radiation, a microwave radiation or a hot air blow, respectively, into an area of the nail to be manipulated according to the controlling instruction of the controlling device based at least on said first and second controlling data.

14. The system of claim 1, wherein the controlling device is configured to perform one or more of: X, Y and Z directional, and rotational movements of said manipulation device.

15. The system of claim 1, wherein the system comprises a communication device for communicating the nail information or the object related data outside the system.

16. The system of claim 1, wherein the system comprises a display for displaying a real-time image or a video image of a manipulation process performed by the manipulation device.

17. A nail manipulation system for producing an object onto a nail, wherein the system comprises:

a shape information providing device for providing nail information of at least a shape of the nail to be manipulated, whereupon the system is configured to provide first controlling data based on said nail information, wherein the shape information providing device is a 3D-surface capturing device, an object providing device for providing object data, comprising object data related to the object to be produced onto the nail, whereupon the system is configured to provide second controlling data based on said object data, a manipulation device, wherein said manipulation device is configured to produce said object onto the nail to be manipulated, and a controlling device for controlling operation of the manipulation device based on said first and second controlling data to produce said object onto the nail to be manipulated, wherein the manipulation device comprises a dispenser configured to provide a nail manipulating medium following three dimensional shape of the nail to be manipulated according to a controlling instruction from the controlling device based at least on said first and second controlling data, wherein the nail manipulating medium is a gel, paint, lacquer or an adhesive, and wherein the system is configured, before producing said object onto the nail, to perform the object production onto an artificial nail, and the system further comprises a transferring device configured to transfer said artificial nail with the produced object onto the nail.

18. The system of claim 17, wherein the system comprises a holder for keeping the artificial nails which are produced in the system or which are ready artificial nails.

19. The system of claim 18, wherein the transferring device comprises a vacuum pick and a place head operated according to controlling instructions of the controlling device based at least on said first and second controlling data.

20. The system of claim 17, wherein the system comprises a supporting member for supporting the artificial nail.

21. A method for a nail manipulation, wherein the method, performed by a nail manipulation system, comprises steps of:

capturing at least a 3D shape of a nail to be manipulated to provide nail information, and providing first controlling data based on said nail information;

providing object data related to an object to be produced onto the nail, and providing second controlling data based on said object data, producing said object onto the nail to be manipulated by using a manipulation device; and controlling operation of the manipulation device based on said first and said second controlling data by a controlling device in order to produce said object onto the nail to be manipulated, wherein the manipulation device comprises a dispenser configured to provide a nail manipulating medium according to a controlling instruction from the controlling device based at least on said first and second controlling data, and wherein the nail manipulating medium is a gel, paint, lacquer or an adhesive.

22. The method of claim 21, wherein the nail information is provided by a scanner, or a mechanical tip-like scanning device, both configured to scan a 3D shape and the position of the nail to be manipulated; whereupon the system is configured to form the first controlling data using at least a portion of said nail information.

23. The method of claim 21, wherein the shape of the object corresponds to the shape of the nail to be manipulated based on said first and second controlling data.

24. The method of claim 21, wherein producing said object onto the nail comprises performing the object production first onto an artificial nail, and then transferring, using a transferring device, said artificial nail with the produced object onto the nail.

* * * * *